(12) United States Patent
Imata et al.

(10) Patent No.: US 8,150,186 B2
(45) Date of Patent: Apr. 3, 2012

(54) AMOUNT-OF-COMPRESSED DATA CONTROL METHOD AND IMAGE DATA COMPRESSING APPARATUS

(75) Inventors: Masanori Imata, Kanagawa (JP); Toshihiko Hirose, Kanagawa (JP); Michio Hirai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1161 days.

(21) Appl. No.: 11/946,582

(22) Filed: Nov. 28, 2007

(65) Prior Publication Data

US 2008/0131015 A1    Jun. 5, 2008

(30) Foreign Application Priority Data

Dec. 4, 2006 (JP) ................ P2006-327159

(51) Int. Cl.
*G06K 9/36* (2006.01)

(52) U.S. Cl. ........ 382/251; 382/239; 382/250; 382/248; 382/253; 358/240.1; 358/204.05; 358/240.12; 358/240.26

(58) Field of Classification Search .............. 382/239, 382/250, 251, 245, 248, 253, 232; 358/240.11, 358/240.05, 240.12, 240.26
See application file for complete search history.

(56) References Cited

U.S. PATENT DOCUMENTS

| | | | | |
|---|---|---|---|---|
| 5,206,884 A | * | 4/1993 | Bhaskar | 375/254 |
| 6,600,836 B1 | * | 7/2003 | Thyagarajan et al. | 382/239 |
| 6,657,576 B2 | * | 12/2003 | Matsuura | 341/200 |
| 6,693,963 B1 | * | 2/2004 | Taniguchi | 375/240.11 |
| 7,570,827 B2 | * | 8/2009 | Yang et al. | 382/245 |
| 2003/0202707 A1 | * | 10/2003 | Thyagarajan et al. | 382/239 |
| 2004/0151253 A1 | * | 8/2004 | Bossen | 375/243 |

FOREIGN PATENT DOCUMENTS

| | | |
|---|---|---|
| JP | 03-224362 | 10/1991 |
| JP | 2000-114980 | 4/2000 |
| JP | 2001-061148 | 3/2001 |
| JP | 2004-056680 | 2/2004 |
| JP | 2004056680 A * | 2/2004 |

\* cited by examiner

*Primary Examiner* — Brian Q Le
*Assistant Examiner* — Mekonen Bekele
(74) *Attorney, Agent, or Firm* — Finnegan, Henderson, Farabow, Garrett & Dunner, L.L.P.

(57) ABSTRACT

An amount-of-compressed-data control method applicable to image data compression processing for compressing an amount of data is disclosed. The method includes the steps of: performing quantization by: dividing one digital image into multiple blocks each having n×n pixels; performing orthogonal transform on each block; and dividing n×n conversion coefficients resulting from the conversion by each threshold value of a quantization matrix including n×n threshold values each resulting from the multiplication of a predetermined coefficient S (where S is a positive real number); and variable-length encoding the quantized data. In this method, the value of the coefficient S allows the amount of compressed data to fit within a predetermined range of a target amount of data by performing the quantization and encoding by dividing the interval that the coefficient S can take on into multiple intervals and calculating the estimated value of the coefficient S based on the relationship between the amount of compressed image data and the coefficient S, which is defined for each of the divided intervals.

12 Claims, 6 Drawing Sheets

FIG. 7

| j\i | 1 | 2 | 3 | 4 | 5 | 6 | 7 | 8 |
|---|---|---|---|---|---|---|---|---|
| 1 | 16 | 11 | 10 | 16 | 24 | 40 | 51 | 61 |
| 2 | 12 | 12 | 14 | 19 | 26 | 58 | 60 | 55 |
| 3 | 14 | 13 | 16 | 24 | 40 | 57 | 69 | 56 |
| 4 | 14 | 17 | 22 | 29 | 51 | 87 | 80 | 62 |
| 5 | 18 | 22 | 37 | 56 | 68 | 109 | 103 | 77 |
| 6 | 24 | 35 | 55 | 64 | 81 | 104 | 113 | 92 |
| 7 | 49 | 64 | 78 | 87 | 103 | 121 | 120 | 101 |
| 8 | 72 | 92 | 95 | 98 | 112 | 100 | 103 | 99 |

FIG. 8

| j\i | 1 | 2 | 3 | 4 | 5 | 6 | 7 | 8 |
|---|---|---|---|---|---|---|---|---|
| 1 | 17 | 18 | 24 | 47 | 66 | 99 | 99 | 99 |
| 2 | 18 | 21 | 26 | 66 | 99 | 99 | 99 | 99 |
| 3 | 24 | 26 | 56 | 99 | 99 | 99 | 99 | 99 |
| 4 | 47 | 66 | 99 | 99 | 99 | 99 | 99 | 99 |
| 5 | 99 | 99 | 99 | 99 | 99 | 99 | 99 | 99 |
| 6 | 99 | 99 | 99 | 99 | 99 | 99 | 99 | 99 |
| 7 | 99 | 99 | 99 | 99 | 99 | 99 | 99 | 99 |
| 8 | 99 | 99 | 99 | 99 | 99 | 99 | 99 | 99 |

FIG. 9

| j\i | 1 | 2 | 3 | 4 | 5 | 6 | 7 | 8 |
|---|---|---|---|---|---|---|---|---|
| 1 | 0 | 1 | 5 | 6 | 14 | 15 | 27 | 28 |
| 2 | 2 | 4 | 7 | 13 | 16 | 26 | 29 | 42 |
| 3 | 3 | 8 | 12 | 17 | 25 | 30 | 41 | 43 |
| 4 | 9 | 11 | 18 | 24 | 31 | 40 | 44 | 53 |
| 5 | 10 | 19 | 23 | 32 | 39 | 45 | 52 | 54 |
| 6 | 20 | 22 | 33 | 38 | 46 | 51 | 55 | 60 |
| 7 | 21 | 34 | 37 | 47 | 50 | 56 | 59 | 61 |
| 8 | 35 | 36 | 48 | 49 | 57 | 58 | 62 | 63 |

AMOUNT-OF-COMPRESSED DATA CONTROL METHOD AND IMAGE DATA COMPRESSING APPARATUS

CROSS REFERENCES TO RELATED APPLICATIONS

The present invention contains subject matter related to Japanese Patent Applications JP 2006-327159 filed in the Japanese Patent Office on Dec. 4, 2006, the entire contents of which being incorporated herein by reference.

BACKGROUND OF THE INVENTION

1. Field of the Invention

The present invention relates to an amount-of-data control method for controlling the compression rate such that the amount of compressed data can be equal to a target amount of data in a case where still image data is to be compressed and transmitted or recorded and to an image data compressing apparatus applying the amount-of-data control.

2. Description of the Related Art

Various standardization methods such as JPEG have been proposed for standardization of still image encoding.

FIG. 6 is a schematic diagram showing processing steps of JPEG. The system divides one input image into multiple blocks each having 8×8 pixels, performs two-dimensional discrete cosine transform (DCT) on each of the blocks (step P1) and performs quantization by dividing the resulting DCT coefficient by each threshold of the quantization matrix including 8×8 thresholds (step P2).

FIGS. 7 and 8 are examples of the quantization matrices for intensity signals and color-difference signals.

A difference is obtained between the direct current (DC) component of the quantized DCT coefficient and the DC component quantized in the previous block, and Huffman encoding is performed on the number of bits of the difference. Zigzag scan is performed on the alternate current (AC) component within each of the blocks to convert to a one-dimensional progression, and two-dimensional Huffman encoding is performed thereon with the number of bits of the valid coefficient and the number of serial zeros (invalid coefficient) (steps P3 and P4). FIG. 9 shows a table of the zigzag scan.

Notably, in the quantization in step P2, each threshold value of the quantization matrix is multiplexed by a certain coefficient (scale factor) and is then divided by a DCT coefficient. The scale factor is a value expressed by "2^S" (where S=0, ±1, ±2 ..., and ^ is a power). The multiplication of each threshold value of the quantization matrix by 2^S is equivalent to the bit shift of the data of each threshold value. The image quality and compression rate of a compressed image may be adjusted by the scale factor.

The thus compressed data is expanded by the reverse steps of steps P1 to P4. In other words, Huffman decoding in step P5, the decoding of the DC component and AC component in step P6, the inverse quantization in step P7 and the inverse DCT (IDCT) in step P8 are performed.

By the way, since this system uses Huffman codes, which are variable length codes, for data compression, it is difficult to know the entire amount of compressed data until the end of the compression process (steps P1 to P4). Therefore, some control over the amount of data is desirable for encoding within a predetermined range of amounts of data. In the past, multiple kinds of scale factor are used for compression, and the amount of compressed data is measured for each case, and the relationships between the scale factors and the amounts of compressed data are obtained. Then, the scale factor corresponding to a given amount of compressed data is inferred from analogy, and data compression is performed with the scale factor by analogy.

Based on measurement results on many images, the relationship between an amount of compressed data and a scale factor is verified as:

[Amount of Data]=$A$·log [Scale Factor]+$B$ (where A and B: constants determined by a measurement point)

Therefore, A and B are obtained from a measurement result, and the scale factor to the target amount of compressed data can be estimated therefrom (refer to JP-A-3-224362 (Patent Document 1)).

SUMMARY OF THE INVENTION

By the way, the amount-of-data control method has a problem in recording compressed data to a recording medium or transmitting compressed data through a communication path that the compressed data to be recorded does not fit into a predetermined storage area or may not be transmitted in a predetermined transmission band if the amount of data based on the estimated scale factor has a plus error in a case where the amount of data is larger or smaller than planned. Conversely, it is difficult to estimate the recording time and/or transmission time if the error is minus and large though no problems may occur regarding the recording area and/or transmission band.

Further increases of the error in amount of data may occur since it is difficult for a compressor having a characteristic not expressible by a single relational expression to estimate an optimum scale factor though the processing above uses a single relational expression to estimate a scale factor.

The scale factor varies since the amount of data with an estimated scale factor may increase or decrease every time the data is compressed even in a case where one same image is continuously compressed as in a still-image serial recording device or a still image serial transmitter, which is used in the processing above, where images are serially compressed. As a result, the amount of data varies, which prevents stable image quality.

Accordingly, it is desirable to provide control over an amount of compressed data such that the amount of compressed data can be securely within a predetermined range of a target amount of data.

The invention is applicable to image data compression processing performing quantization by dividing one digital image into multiple blocks each having n×n pixels, performing discrete cosine transform on each block, and dividing n×n conversion coefficients resulting from the conversion by each threshold value of a quantization matrix including n×n threshold values each resulting from the multiplication of a predetermined coefficient S (where S is a positive real number) and variable-length encoding the quantized data.

The processing allows the amount of compressed data to fit within a predetermined range by performing the quantization and encoding by defining a specific value as the coefficient S, obtaining a new coefficient S by predetermined processing based on the amount of compressed data obtained therewith, performing quantization and encoding again, repeating these steps until the amount of compressed data fits within the predetermined range.

Alternatively, quantization and encoding may be performed by defining a specific value as the coefficient S, and a new coefficient S may be obtained by predetermined processing based on the amount of compressed data obtained therewith. Then, quantization and encoding may be performed by applying the coefficient S to the image to be compressed next such that the amount of compressed data of the next and subsequent images can fit within a predetermined range.

The predetermined processing here is assumed as including defining a relational expression between the amount of compressed data and a scale factor for each of multiple intervals of the scale factor, and estimating the scale factor.

Alternatively, the predetermined processing can correct the estimation error of the scale factor by defining the relational expression between the amount of compressed data and the scale factor along with an array that corrects the amount of compressed data corresponding to each value of the scale factor.

Alternatively, the predetermined processing may minimize the variation of the amount of data by using, for quantization, the scale factor with a variation minimized by smoothing in time the estimated values of the scale factor obtained from the relationship between the amount of compressed data and the scale factor.

Thus, the amount of compressed data can securely fit within a predetermined range, which prevents the problem that the amount of compressed data does not fit within a planned recording area or transmission band. The recording time and/or transmission time can also be estimated easily. The image quality after compression is also stabilized.

According to embodiments of the invention, the value of a scale factor is adjusted by using the relationship between an amount of compressed data and the scale factor, which is defined for each of multiple Intervals of the scale factor. Thus, a more proper scale factor can be estimated than that of the case using a single relationship, and the amount of compressed data can fit within a predetermined range of a target amount of data.

According to embodiments of the invention, since means for correcting a scale factor is provided, a proper scale factor can be estimated, and the amount of compressed data can fit within a predetermined range of a target amount of data.

According to embodiments of the invention, since means for smoothing scale factors, the variation of the scale factor is minimized, and the amount of compressed data can fit within a predetermined range of a target amount of data.

BRIEF DESCRIPTION OF THE DRAWINGS

FIG. 7 is an explanatory diagram showing a quantization matrix of intensity signals;

FIG. 8 is an explanatory diagram showing a quantization matrix of color-difference signals; and FIG. 9 is an explanatory diagram showing a table of zigzag scan.

DESCRIPTION OF THE PREFERRED EMBODIMENTS

With reference to FIGS. 1 to 4, a first embodiment of the invention will be described below.

Figure 1:
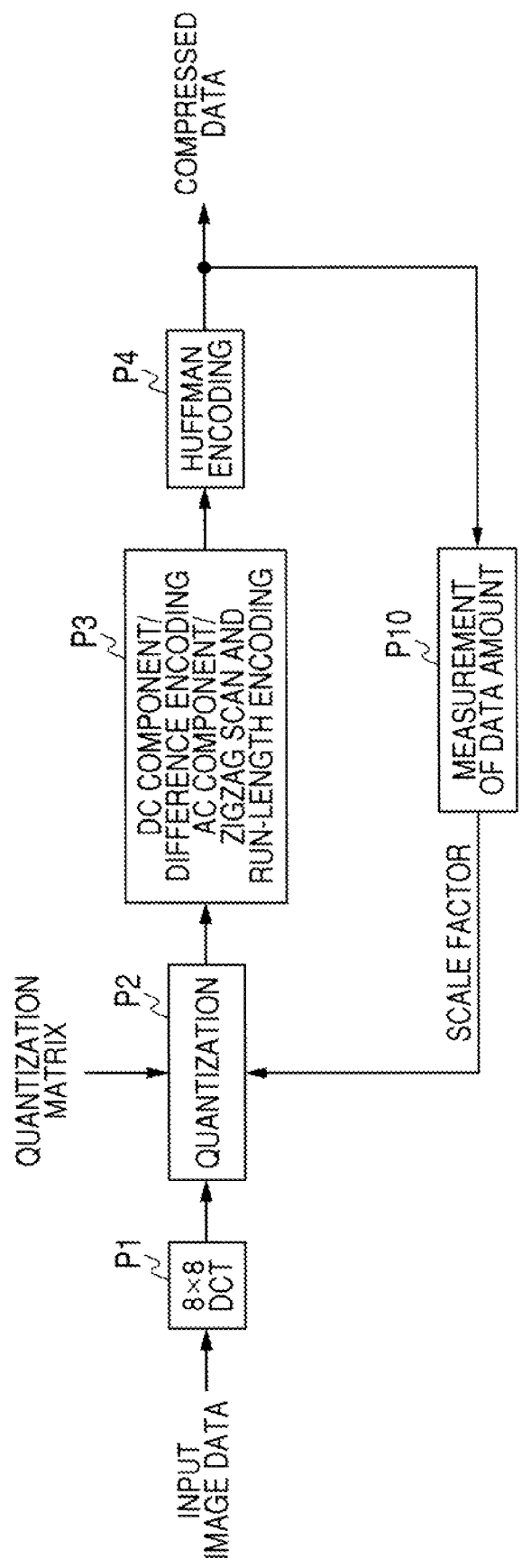
FIG. 1 is a block diagram showing a processing example of control over an amount of compressed data according to a first embodiment of the invention.
Figure 6:
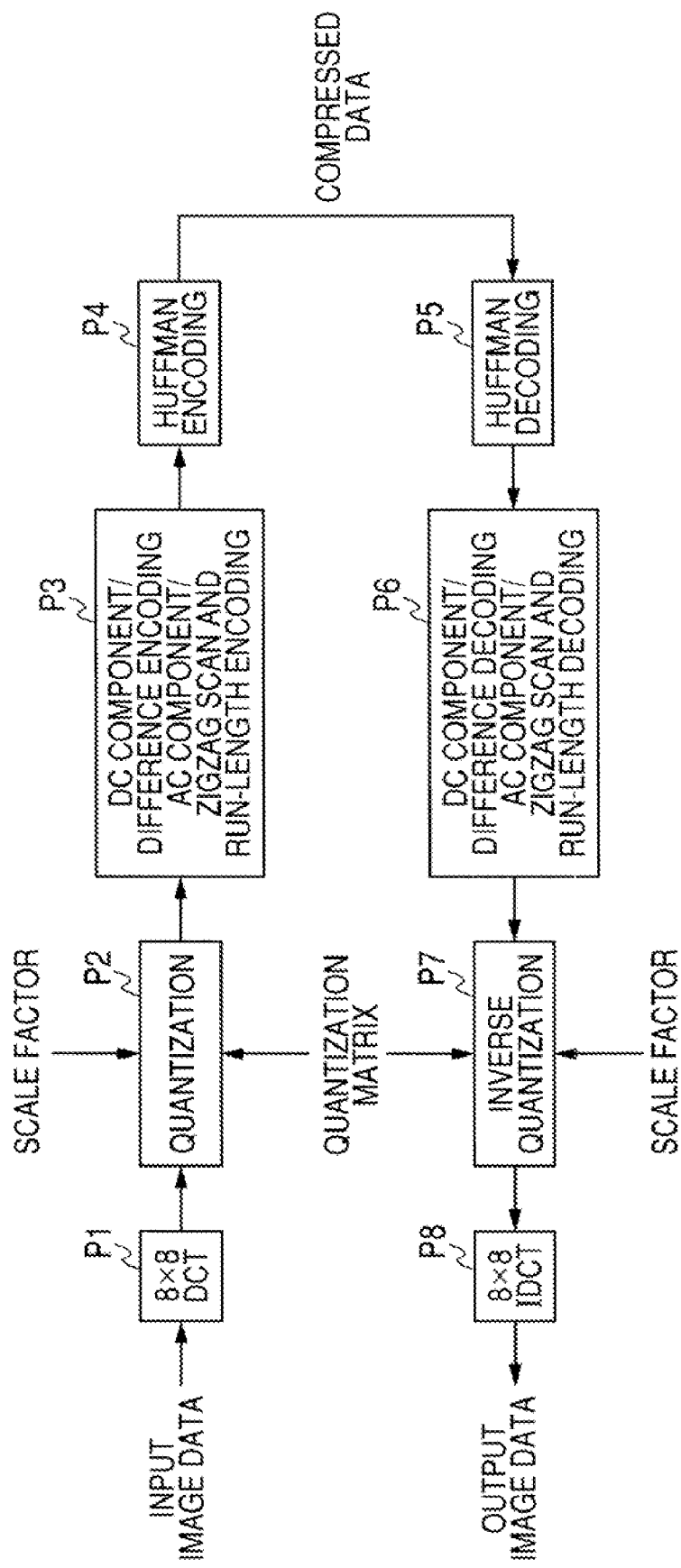
FIG. 6 is a block diagram showing a processing example of compression/expansion processing in the past.

FIG. 1 is a schematic diagram showing a configuration example of processing steps applying the control over an amount of compressed data according to a first embodiment. In the description, the same reference numerals are given to the same components as those in FIG. 6, which have been described in the example in the past.

First of all, input image data is divided into multiple blocks each having n×n pixels such as 8×8 pixels horizontally and vertically, and two dimensional discrete cosine transform (DCT) is performed on each of the blocks (process P1).

The DCT is a kind of orthogonal transform in a frequency region and is defined by:

$$F(u, v) = \frac{4C(u)C(v)}{n \cdot n} \sum_{i=0}^{n-1} \sum_{j=0}^{n-1} f(i, j) \times \cos\frac{(2i+1)u\pi}{2n} \cos\frac{(2j+1)v\pi}{2n} \quad \text{(Expression 1)}$$

where the conversion coefficient is F(u,v), and the input image data of each one block is f(i,j).

$$\text{In this case,} \quad C(w) = 1/\sqrt{2}(w=0)$$
$$= 1(w \neq 0).$$

The obtained conversion coefficient F(u,v) indicates the component resulting from the decomposition of input image data of each one block into spatial frequencies.

The conversion coefficient F(0,0) indicates the value (DC component) proportional to the average value of the n×n pixels of input image data f(i,j). F(u,v) exhibits a component (AC component) having a spatial frequency increasing as u and/or v increase/increases.

The quantization is performed by dividing the thus obtained two-dimensional DCT coefficient by the value resulting from the multiplication of each threshold value of a quantization matrix including n×n threshold values by a scale factor S (process P2). The multiplication processing on each threshold value of a quantization matrix by a scale factor S is equivalent to the expansion/contract of each threshold value of the quantization matrix, and the increase/decrease in amount of compressed data can be adjusted by the scale factor.

Next, for the DC component, a difference is obtained between the quantized conversion coefficient F' (u,v) and the DC component quantized on the previous block (process P3). Then, Huffman encoding is performed on the number of bits of the difference (process P4). The AC component is zigzag scanned in the order shown in FIG. 9 and is converted to a one-dimensional progression. Then, the run-length encoding is performed thereon for compressing the number of serial zero data (process P3), and two-dimensional Huffman encoding is performed thereon with run-length encoded data of the number of serial zero data and the data of the number of bits of the valid coefficient (process P4).

Huffman encoding is performed on the number of bits for expressing a value where the Huffman encoding does not use the DC component and the AC component and the quantized coefficients directly. Then, the value of the number of bits is added as added information separately from the Huffman codes. For example, a quantized coefficient 2 (in base 10) is expressed as "000 . . . 010" in base 2. The number of bits 2 for expressing this is Huffman encoded as a representative value, and the data of 2 bits "10" is added as added bits.

On the other hand, the data resulting from the subtraction of "1" from the added bits is added if the quantized coefficient is negative. For example, if the quantized coefficient is −2 (in base 10) and is expressed as "111 . . . 110" in base 2 (which is a complement number of two), the last two bits are added bits. Then, "01" resulting from the subtraction of "1" from "10" is added as the added bits. Thus, the added bits start with "1" if the quantized coefficient is positive and with "0" if negative, which allows easy determination of positive or negative.

Next, after measuring the amount of compressed data and obtaining a new coefficient S based on a predetermined method, quantization and encoding are performed thereon again. These processes are repeated until the amount of compressed data fits within a predetermined range such that the amount of compressed data can fit with in a predetermined range. Alternatively, after measuring the amount of compressed data and obtaining a new coefficient S based on a predetermined method, quantization and encoding may be performed by applying the coefficient S to the image to be compressed next such that the amount of compressed data of the next and subsequent images can fit within a predetermined range (process P10).

Figure 2:
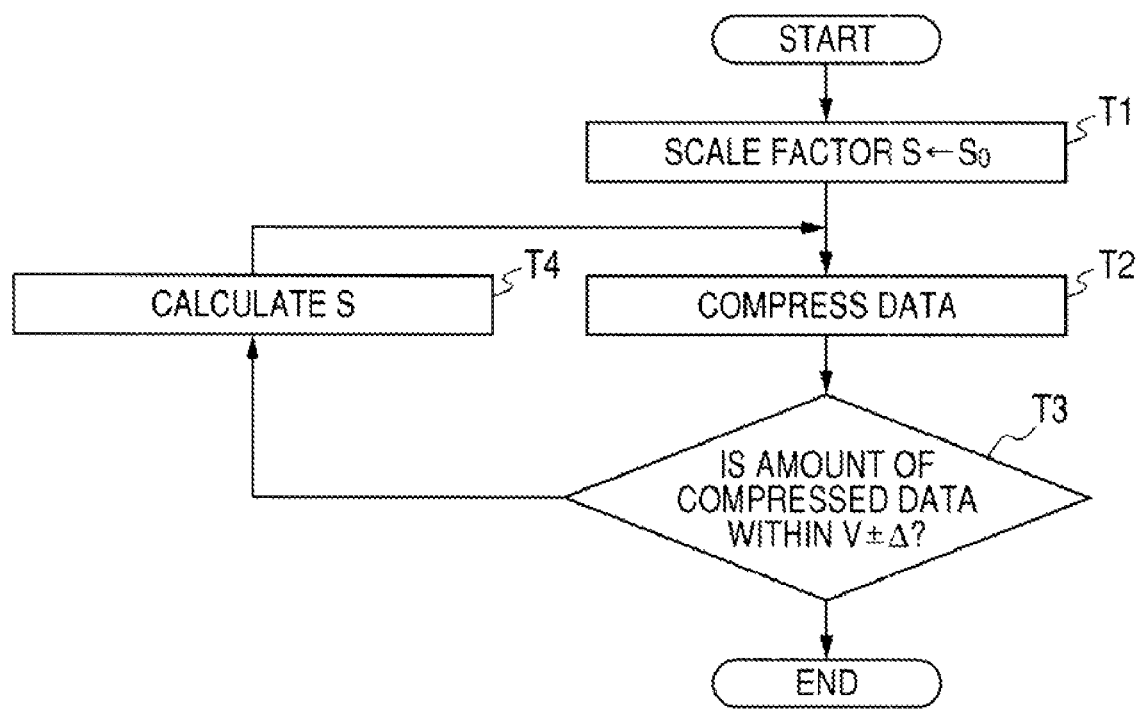
FIG. 2 is a flowchart for describing the operation in FIG. 1.

Describing the operation of the predetermined method with reference to the flowchart in FIG. 2, the value of a specific value S0 is defined as the scale factor S (step T1), and data compression processing in processes P2 to P4 is performed (step T2). The value S0 may be any value within the range that the scale factor can take on, as shown in FIG. 3.

Next, whether the amount of data compressed with the selected value S0 is within a predetermined range of the target amount of data V (step T3), and processing ends if within the predetermined range of the amount of data V. If not, the value of the scale factor allowing the amount of compressed data V to fit within the predetermined range is calculated based on the relationship between the scale factor divided into multiple intervals and the amounts of compressed data, as shown in FIG. 3, (step T4), and the data compression processing in the processes P2 to P4 is performed again (step T2). Then, whether the amount of compressed data is within the predetermined range of the amount of data V or not is determined again (step T3). The processing in steps T2 to T4 is repeated, and the processing ends if the amount of compressed data fits with in a predetermined range of the target amount of data V.

Figure 3:
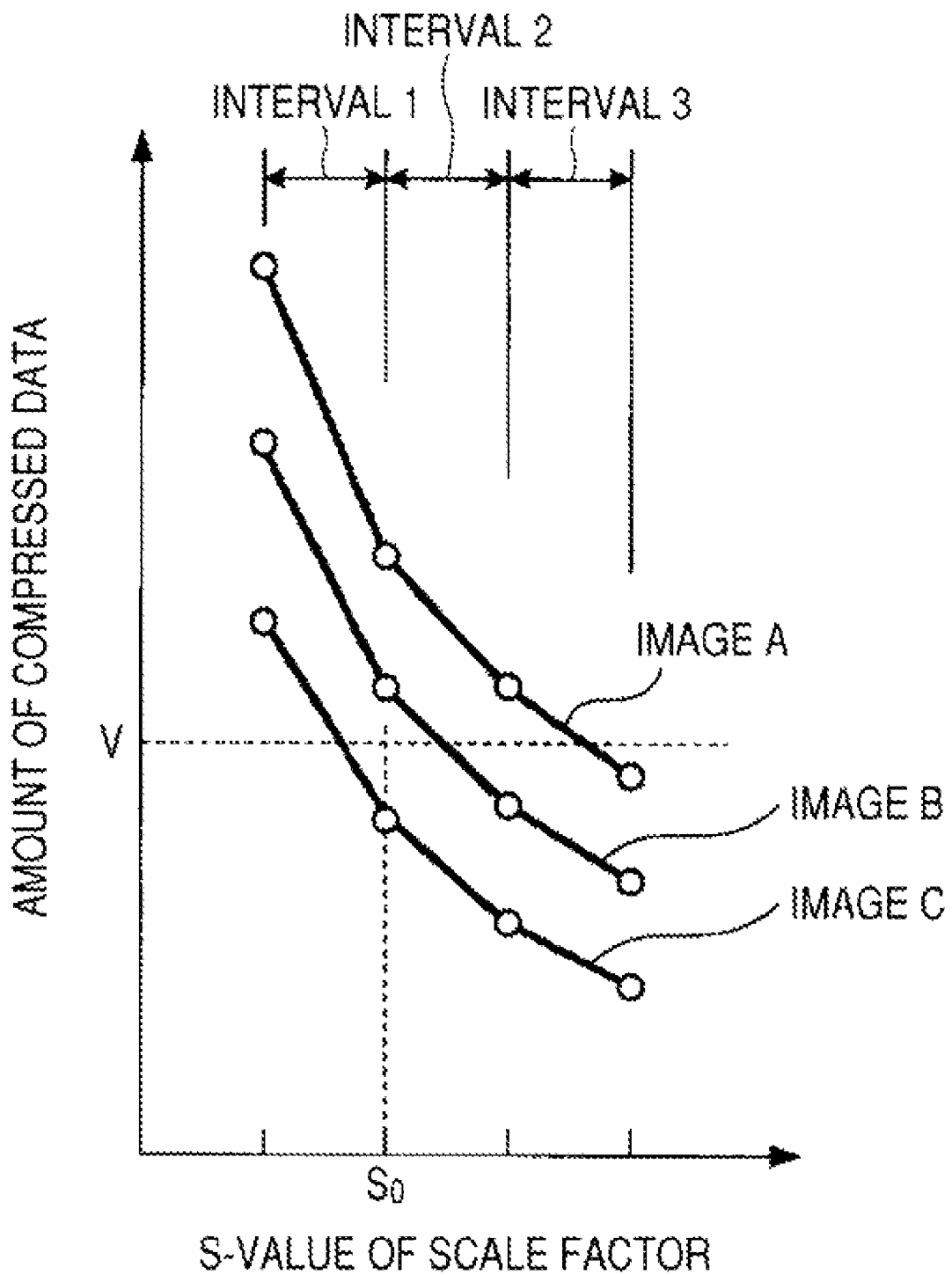
FIG. 3 is an explanatory diagram illustrating the relationship between a scale factor and an amount of compressed data.
Figure 4:
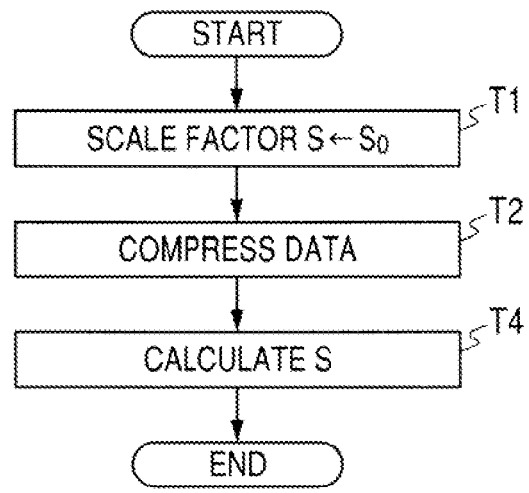
FIG. 4 is a flowchart describing a variation example of the operation in FIG. 1.

Alternatively, as shown in the flowchart in FIG. 4, the value of the scale factor allowing the amount of compressed data V to fit within a predetermined range may be calculated from the relationship between the scale factor divided into multiple intervals and the amount of compressed data, as shown in FIG. 3, (step T4) and the processing may end, without determining whether the amount of the compressed data fits within the predetermined range of the amount of data V or not. In this case, the value of the thus obtained may be used as the S0 in step T1 for the compression of the next image.

The calculation of the "S" in step T4 may include dividing each of the scale factors for various sample images into multiple intervals, finding the relationships between the scale factors and the amount of compressed data in advance, and calculating the value of the scale factor among them that allows the amount of compressed data to fit within a predetermined range of the amount of data V by setting the scale factor, as shown in FIG. 3. For example, the relationship between the amount of compressed data and the scale factor may be defined by three relational expressions of:

$$[\text{Amount of Data}] = B0/[\text{Scale Factor}] \qquad \text{(Expression 2)}$$

for Interval 1;

$$[\text{Amount of Data}] = \sqrt{(B1/[\text{Scale Factor}])} \qquad \text{(Expression 3)}$$

for Interval 2; and $$[\text{Amount of Data}] = A \cdot \log [\text{Scale Factor}] + B2 \qquad \text{(Expression 4)}$$

for Interval 3,
(where A, B0, B1 and B2: constants determined by measurement points, and "log" indicates the logarithm in base 2). The equation for calculating the scale factor to a target amount of compressed data is given by:

$$[\text{Scale Factor}] = (B0/[\text{Target Amount of Data}]) \qquad \text{(Expression 5)}$$

for Interval 1;

$$[\text{Scale Factor}] = B1/([\text{Target Amount of Data}]^2) \qquad \text{(Expression 6)}$$

for Interval 2; and $$[\text{Scale Factor}] = 2^{\{([\text{Target Amount of Data}] - B2)/A\}} \qquad \text{(Expression 7)}$$

for Interval 3,
(where A, B0, B1 and B2: constants determined by measurement points, and x^y indicates x raised to the yth power).

Figure 5:
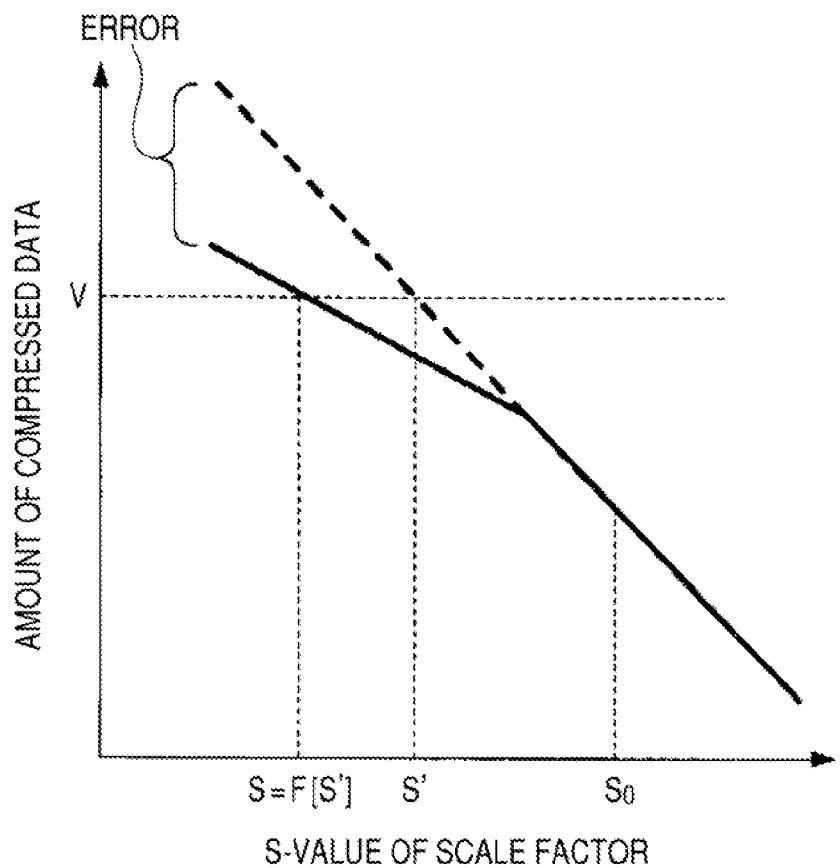
FIG. 5 is an explanatory diagram illustrating the relationship between a scale factor and an amount of compressed data according to a second embodiment of the invention.

With reference to FIG. 5, for example, a second embodiment of the invention will be described next. The basic outline of the processing in the second embodiment is the same as that of the first embodiment but is different in that the value of a scale factor S is defined as a specific value S0 first (step T1), and the data compression processing in processes P2 to P4 is performed (step T2), describing with reference to the flowchart in FIG. 2, for example. The value S0 may be any value within a range the scale factor can take on, as shown in FIG. 5.

Next, whether the selected value S0 allows the amount of compressed data within a predetermined range of target amount of data V or not is determined (step T3), and the processing ends if so. If not, the value of the scale factor allowing the amount of compressed data V within the predetermined range is calculated from the relationship between the scale factor and the amount of compressed data and the conversion array for the correction, as shown in FIG. 5 (step T4). Then, the data compression processing in processes P2 to P4 is performed again (step T2), and whether the amount of compressed data fits within the predetermined amount of data V or not is determined again (step T3). The processing in steps T2 to T4 is repeated in this way, and the processing ends when the amount of compressed data fits within the predetermined range of the target amount of data V.

Alternatively, the value of the scale factor allowing the amount of compressed data V within a predetermined range may be calculated from the relationship between the scale factor divided into multiple intervals and the amount of compressed data, as shown in FIG. 5, and a conversion array for the correction (step T4), and the processing may end, without determining whether the amount of compressed data fits within a predetermined range of the amount of data V or not, as shown in FIG. 4. In this case, the thus obtained value of the scale factor is used as S0 in step T1 for compressing the next image.

The calculation of the "S" in step T4 may include finding the relationships between the scale factors and the amount of compressed data, as shown in FIG. 5, and obtaining a coefficient for correcting the scale factor in advance, and calculating the value of the scale factor among them that allows the amount of compressed data to fit within a predetermined range of the amount of data V by setting the scale factor. For example, the relationship between the amount of compressed data and the scale factor may be defined as:

$$[\text{Amount of Data}] = \sqrt{(B1/[\text{Scale Factor}])} \quad \text{(Expression 8)}$$

(where B1: a constant determined by a measurement point). The equation for calculating the scale factor to a target amount of compressed data is given by:

$$[\text{Provisional Scale Factor}] = (B1/[\text{Target Amount of Data}]^2) \quad \text{(Expression 9)};$$

and $$[\text{Scale Factor}] = F[\text{Provisional Scale Factor}] \quad \text{(Expression 10)}$$

(where B1: a constant determined by a measurement point, x^y indicates x raised to the yth power, and F is a conversion array that corrects the scale factor). In the conversion array, the provisional scale factor before the conversion is substituted into the subscript in the array within [ ], and the converted scale factor is obtained.

In order to adjust the amount of compressed data to V, the provisional scale factor S' is calculated which is on a straight extension of the relationship between the current scale factor S0 and the amount of compressed data, as shown in FIG. 5. The scale factor S can be obtained from F[S'] resulting from the substitution of the S' into the subscript of the conversion array, which has been found and created in advance. Then, in order to estimate the next scale factor from the scale factor, the inverse conversion is performed thereon to return to S', and the next provisional scale factor is obtained along the straight line. The obtained provisional scale factor is converted with the array F, and the result is handled as the next scale factor.

Next, a third embodiment of the invention will be described. The outline of this embodiment is the same as that of the first embodiment but is different in that a specific value S0 first is defined as the value of a scale factor S (step T1), and the data compression processing in steps P2 to P4 is performed (step T2), describing with reference to the flowchart in FIG. 2, for example. The value S0 may be any value within a range the scale factor can take on.

Next, whether the selected value S0 allows the amount of compressed data within a predetermined range of target amount of data V or not is determined (step T3), and processing ends if so. If not, the value of the scale factor allowing the amount of compressed data V within the predetermined range is calculated from the relationship between the scale factor and the amount of compressed data (step T4). Then, the data compression processing in processes P2 to P4 is performed again (step T2), and whether the amount of compressed data fits within the predetermined amount of data V or not is determined again (step T3). The processing in steps T2 to T4 is repeated in this way, and the processing ends when the amount of compressed data fits within the predetermined range of the target amount of data V.

Alternatively, the value of the scale factor allowing the amount of compressed data V within a predetermined range may be calculated from the relationship between the scale factor and the amount of compressed data (step T4), and the processing may end, without determining whether the amount of compressed data fits within a predetermined range of the amount of data V or not, as shown in FIG. 4. In this case, the thus obtained value of the scale factor is used as S0 in step T1 for compressing the next image.

The calculation of the "S" in step T4 may include finding the relationships between the scale factors and the amount of compressed data for various sample images in advance and calculating the value of the scale factor among them that allows the amount of compressed data to fit within a predetermined range of the amount of data V by setting the scale factor. For example, the relationship between the amount of compressed data and the scale factor may be defined as:

$$[\text{Amount of Data}] = \sqrt{(B1/[\text{Scale Factor}])} \quad \text{(Expression 11)}$$

(where B1: a constant determined by a measurement point). The equations for calculating the scale factor to a target amount of compressed data are:

$$[\text{Provisional Scale Factor}] = (B1/[\text{Target Amount of Data}]^2) \quad \text{(Expression 12)}$$

(where B1: a constant determined by a measurement point, and x^y indicates x raised to the yth power); and $$[\text{Scale Factor}] = \quad \text{(Expression 13)}$$
$$r \cdot [\text{Scale Factor Used For Previous Compression}] +$$
$$(1 - r) \cdot [\text{Provisional Scale Factor}]$$

(where r: Attenuation Coefficient $0 \leq r \leq 1$)

In this case, the attenuation coefficient r may be a predetermined fixed value or may be changed every time the compression operation is performed. For example, by defining that r increases as the distance between the scale factor used for the previous compression and the provisional scale factor decreases and decreases as the distance increases, the variation of the scale factor can be minimized upon convergence, and, at the same time, quick response can be provided for a longer distance.

In the three embodiments, the obtained value of the scale factor is used as the scale factor for the compression on the next image, without determining whether the amount of compressed data fits within a predetermined range of the amount of data V, as shown in FIG. 4. This is because obtaining the predetermined amount of data from the next and subsequent images can reduce the load on the processing ability and allows the amount of data to fit within the predetermined range of the target amount of data statically, though a still image serial recording apparatus or still image serial transmitter that performs data compression serially in real time may need to use a compressor having a higher processing ability for performing data compression on one same image repetitively until the predetermined amount of data is obtained.

Having described the three embodiments including a compressor that can adjust the amount of data with a scale factor, a compressor currently exists that adjusts an amount of data with a given image quality parameter, without showing the scale factor itself. Such a compressor has a relationship, for example:

$$[\text{Image Quality Parameter}] = \{(65536 - [\text{Scale Factor}])/65536\} \cdot 100 \quad \text{(Expression 14)}$$

(where $1 \leq [\text{Scale Factor}] \leq 65535$; and $0 \leq [\text{Image Quality Parameter}] \leq 100$).

Therefore, the invention is applicable to a compressor in which the parameter for adjusting an amount of data is not the scale factor itself. The invention may further fully support a compressor having a complicated relationship between the image quality parameter and the scale factor by dividing the scale factor into multiple intervals and defining the relationship between the amount of compressed data and the scale factor or by correcting the value of the scale factor with the conversion array, as described above. Therefore, the invention is also applicable to a compressor that adjusts an amount of data with a given image quality parameter.

It should be understood by those skilled in the art that various modifications, combinations, sub-combinations and alterations may occur depending on design requirements and other factors insofar as they are within the scope of the appended claims or the equivalents thereof.

What is claimed is:

1. A method for compressing image data, comprising:
   quantizing image data corresponding to at least one digital image, the quantizing comprising:
   dividing the image data into a plurality of data blocks, the data blocks comprising corresponding numbers of pixels;
   applying orthogonal transformations to the data blocks, the orthogonal transformations generating corresponding conversion coefficients for the pixels of the data blocks;
   computing scaled threshold values associated with a quantization matrix, based on at least one scale factor and a corresponding scaling interval; and
   calculating quotients of the conversion coefficients and corresponding ones of the scaled threshold values to generate quantized image data; and
   compressing the quantized data in accordance with a variable-length encoding scheme, wherein:
   the at least one scale factor and the scaling interval enable the compressed data to fit within a predetermined range of a target amount of data; and
   the computing comprises:
   partitioning the scaling interval into a plurality of sub-intervals;
   calculating estimated values of the at least one scale factor for the sub-intervals, based on a relationship between the at least one scale factor and an amount of the compressed data; and
   computing the scaled threshold values, based on at least the estimated scale factor values.

2. A method for compressing image data, comprising:
   quantizing image data corresponding to at least one digital image, the quantizing comprising:
   dividing the image data into a plurality of data blocks, the data blocks comprising corresponding numbers of pixels;
   applying orthogonal transformations to the data blocks, the orthogonal transformations generating corresponding conversion coefficients for the pixels of the data blocks;
   computing scaled threshold values associated with a quantization matrix; and
   calculating quotients of the conversion coefficients and corresponding ones of the scaled threshold values to generate quantized image data; and
   compressing the quantized data in accordance with a variable-length encoding scheme, wherein:
   the scaled threshold values enable compressed data to fit within a predetermined range of a target amount of data; and
   the computing comprises:
   determining an initial scale factor for the threshold values, based on the target data amount;
   calculating a corrected scale factor based on the initial scale factor and a correction coefficient; and
   computing the scaled threshold values, based on at least corrected scale factor.

3. A method for compressing image data, comprising:
   quantizing image data corresponding to at least one digital image, the quantizing comprising:
   dividing the image data into a plurality of data blocks, the data blocks comprising corresponding numbers of pixels;
   applying orthogonal transform on each block transformations to the data blocks, the orthogonal transformations generating corresponding conversion coefficients for the pixels of the data blocks;
   computing scaled threshold values associated with a quantization matrix, based on a first scale factor; and
   calculating quotients of the conversion coefficients and corresponding ones of the scaled threshold values to generate quantized image data;
   compressing the quantized data in accordance with a variable-length encoding scheme;
   determining whether an amount of the compressed data falls within a target amount of data; and
   determining, when the compressed data amount fails to fall within the target amount, a second scale factor for the threshold values of the quantization matrix, the determining comprising:
   computing a provisional scale factor for the threshold values of the quantization matrix, based on the target amount of data; and
   calculating the second scale factor based, on an application of an attenuation factor to at least one of the provisional scale factor or the first scale factor,
   wherein the second scale factor enables the amount of compressed data to fit within the target amount of data.

4. An image data compressing apparatus comprising:
   a quantization section for quantizing image data corresponding to at least one digital image, the quantization section being configured to:
   divide the image data into a plurality of data blocks, the data blocks comprising corresponding numbers of pixels;
   applying orthogonal transformations to the data blocks, the orthogonal transformations generating corresponding conversion coefficients for the pixels of the data blocks;
   computing scaled threshold values associated with a quantization matrix, based on at least one scale factor and a corresponding scaling interval; and
   calculating quotients of the conversion coefficients and corresponding ones of the scaled threshold values to generate quantized image data; and
   an image data compressing section for compressing the quantized data, wherein:
   the at least one scale factor and the scaling interval enable the compressed data to fit within a predetermined range of a target amount of data; and
   the quantization section is further configured to:
   partition the scaling interval into a plurality of sub-intervals;
   calculate estimated values of the at least one scale factor for the sub-intervals, based on a relationship between the at least one scale factor and an amount of the compressed data; and
   compute the scaled threshold values, based on at least the estimated scale factor values.

5. An image data compressing apparatus, comprising:
a quantization section for quantizing image data corresponding to at least one digital image, the quantization section being configured to:
   divide the image data into a plurality of data blocks, the data blocks comprising corresponding numbers of pixels;
   apply orthogonal transformations to the data blocks, the orthogonal transformations generating corresponding conversion coefficients for the pixels of the data blocks;
   compute scaled threshold values associated with a quantization matrix; and
   calculate quotients of the conversion coefficients and corresponding ones of the scaled threshold values to generate quantized image data; and
an image data compressing section for compressing the quantized data, wherein:
   the scaled threshold values enable compressed data to fit within a predetermined range of a target amount of data; and
   the quantization section is further configured to:
      determine an initial scale factor for the threshold values, based on the target data amount;
      calculate a corrected scale factor based on the initial scale factor and a correction coefficient; and
      compute the scaled threshold values, based on at least corrected scale factor.

6. An image data compressing apparatus comprising:
a quantization section for quantizing image data corresponding to at least one digital image, the quantization section being configured to:
   divide the image data into a plurality of data blocks, the data blocks comprising corresponding numbers of pixels;
   apply orthogonal transformations to the data blocks, the orthogonal transformations generating corresponding conversion coefficients for the pixels of the data blocks;
   compute scaled threshold values associated with a quantization matrix, based on a first scale factor; and
   calculate quotients of the conversion coefficients and corresponding ones of the scaled threshold values to generate quantized image data;
an image data compressing section for compressing the quantized data in accordance with a variable-length encoding scheme; and
a determination section for:
   determining whether an amount of the compressed data falls within a target amount of data;
   computing a provisional scale factor for the threshold values of the quantization matrix, based on the target amount of data, when the compressed data amount fails to fall within the target data amount; and
   determining the second scale factor for the threshold value of the quantization matrix, based on an application of an attenuation factor to at least one of the provisional scale factor or the first scale factor,
wherein the second scale factor enables the amount of compressed data to fit within the target data amount.

7. The method of claim 1, wherein the at least one scale factor comprises a positive real number.

8. The method of claim 1, wherein:
the quantization matrix comprises a plurality of initial threshold values; and computing the scaled threshold values comprises:
   computing products of the at least one scale factor and corresponding ones of the initial threshold values.

9. The method of claim 2, wherein the at least one scale factor comprises a positive real number.

10. The method of claim 2, wherein the correction coefficient comprises an error associated with the initial scale factor.

11. The method of claim 3, wherein the at least one scale factor comprises a positive real number.

12. The method of claim 3, wherein determining the second scale factor comprises applying a smoothing operation to at least one of the first scale factor or the provisional scale factor, based on the attenuation factor.

* * * * *